Jan. 25, 1944.   N. W. MORSE   2,340,203
COFFEE BREWER APPARATUS
Filed Feb. 7, 1942

Inventor.
Normand W. Morse
By Sheridan, Davis & Cargill
Attys.

Patented Jan. 25, 1944

2,340,203

UNITED STATES PATENT OFFICE 2,340,203

COFFEE BREWER APPARATUS

Normand W. Morse, Chicago, Ill., assignor to Hill-Shaw Company, Chicago, Ill., a corporation of Illinois Application February 7, 1942, Serial No. 429,870

10 Claims. (Cl. 99—292)

This invention relates to improvements in coffee brewing apparatus.

One object of the invention is to provide improved apparatus for use with vacuum type coffee makers especially where the latter are employed on ships, trains or other vehicles, the apparatus being adapted to prevent the makers from being thrown or tilted off the heat supplying burners by the rolling, jolting, swaying or other movements of the vehicles.

An additional object of the invention is to provide improved mechanism of the type mentioned whereby the assembled upper and lower bowls of a coffee maker can be raised as a unit and can be securely retained in a position wherein the lower bowl is spaced an adequate distance above the burner of the heat source when the water in the lower bowl has moved into the upper bowl, for removing the bowl from the direct influence of the residual heat of the burner to enable the lower bowl to cool readily for effecting the withdrawal of the coffee brew from the upper bowl.

An additional object of the invention is to provide a mechanism of the type having gripping or stabilizing means for both the lower and upper bowls of such coffee making apparatus which enables the user readily to remove the apparatus from a burner or to replace the same thereon by the use of but one hand, thus enabling him to handle simultaneously two lower bowls with or without the respective upper bowls thereon.

Another object of the invention is to provide improved mechanism of the type mentioned provided with means for positively locking the same against release of the lower bowl while the latter is an elevated position above the burner.

Other objects relate to various features of construction and arrangement of parts which will be apparent from a consideration of the following specification and accompanying drawing, wherein Figure 1 is a side elevation of apparatus embodying the present improvements;

Figure 1:
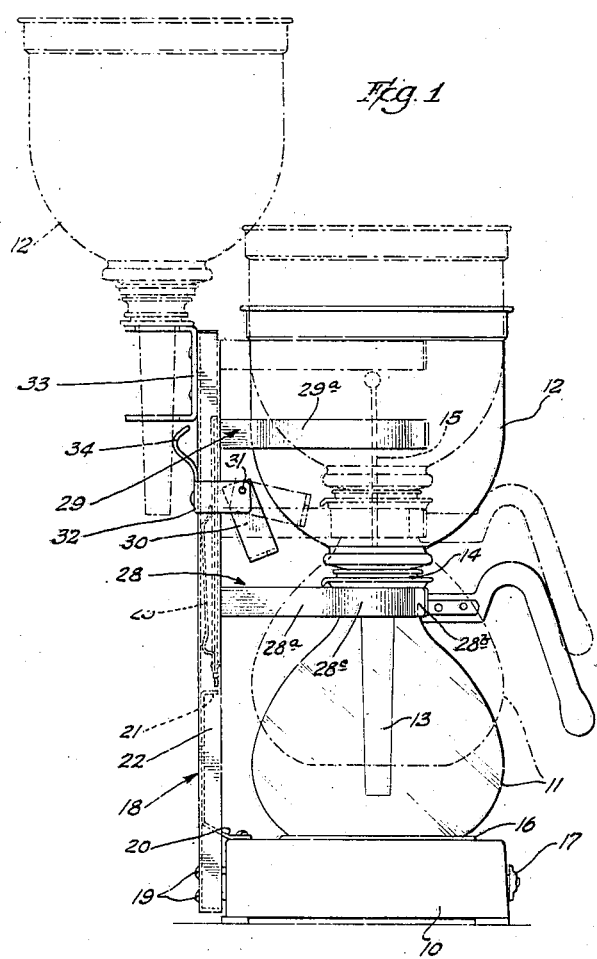

In the drawing, 10 indicates a source of heat for a coffee maker of the vacuum type comprising a lower bowl 11, an upper bowl 12 which has a funnel 13 which projects into the lower bowl and is provided also with a sealing gasket 14 at its upper end for providing an air-tight seal between the two bowls during the coffee brewing operations. The upper bowl is provided with a suitable filter, the handle or stem 15 of which only is shown in the drawing since the brewer construction per se constitutes no part of the present invention. The bowls of such coffee brewers, as is well known, generally are formed of glass, although frequently where such coffee makers are used commercially the upper bowls are of metal. The upper bowl shown in the drawing may be assumed to be of metal, although the material of which it is made is not of importance. The lower bowl, as shown in Fig. 1, is adapted to be seated over the source of heat, as on the brick 16 of a heater element which, in the embodiment illustrated, is indicated as being electrical and which may be controlled by a suitable switch 17.

Figure 3:
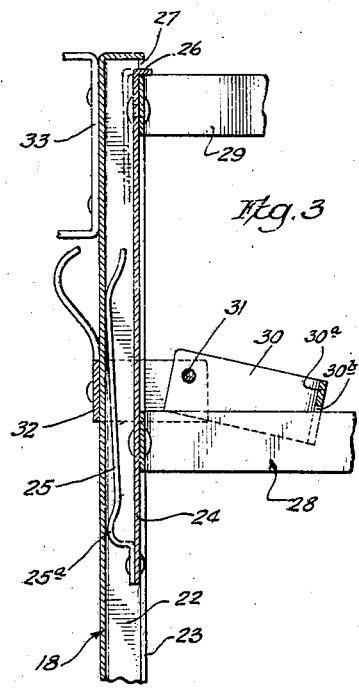
Fig. 3 is an enlarged broken vertical sectional view taken on line 3—3 of Fig. 2.
Figure 4:
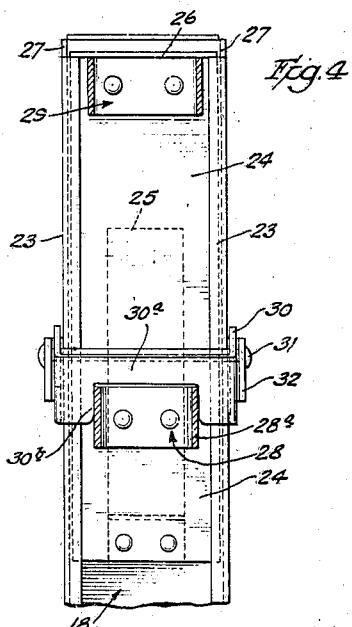
Fig. 4 is a front elevational view of the structure shown in Fig. 3, parts being broken away for the purpose of clarity.

Adjacent the burner there is provided a vertical standard or support 18, and in the embodiment illustrated this support is formed of sheet metal of channel shape and, if desired, may be secured to the casing of the burner 10. In Fig. 1 of the drawing, the standard is shown secured to the casing by means of bolts 19 and by means of a bracket 20 which is attached to the inside of the channel and which, at its upper end is provided with an outwardly directed flange 21 which constitutes a stop as will be hereinafter described. The channel member 18 is provided with side flanges 22 which, at their vertical edges, terminate in inwardly directed flanges 23. A suitable slide member in the form of a metal plate 24 is disposed between the side walls 22 of the standard, the flanges 23 constituting guides or tracks for the slide. Means are provided for retaining the slide 24 normally in contact with the inner face of the flanges 23, the means shown being in the form of a spring 25 which, at its lower end, is riveted to the slide 24 and adjacent its upper end bears against the inner face of the rear wall of the standard 18 thereby tending to press the slide 24 against the inside faces of the flanges 23. The upper end of the plate 24 is provided with an outwardly directed flange 26, as shown in Fig. 3, which when the slide 24 is in the upper position shown in said figure is adapted to project through an interrupted horizontal slot formed in the flanges 23. Adjacent the lower portion of the spring 25 it is shaped to provide a fulcrum 25ᵃ which, when the slide is pressed inwardly or to the left as viewed in Fig. 3, contacts the rear wall of the standard 18 and permit the slide 24 to tilt counter-clockwise against the action of the spring 25 and thereby move the flange 26 inwardly of the slot 27 as to the dotted line position shown in Fig. 3 to enable the slide to be lowered within the standard. The slide can be lowered, or in fact it will gravitate to the position shown in Fig. 1, in which position the lower end of the slide will abut the flange or stop member 21 above referred to.

Figure 2:
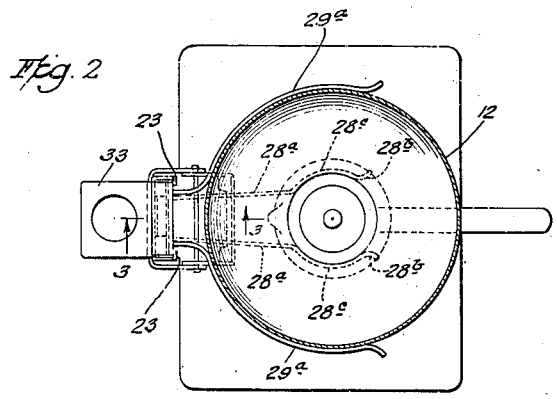
Fig. 2 is a top plan view of the apparatus shown in Fig. 1.

For the purpose of stabilizing a coffee brewer of the type mentioned on the heater to prevent its being tilted or thrown therefrom by accident or by the rolling or other movements of the vehicle, such as a ship or train upon which the apparatus is employed, suitable gripping members are provided for engaging both bowls 11 and 12, preferably. The gripping member for the lower bowl 11 is indicated generally by the numeral 28 and comprises a pair of forwardly extending arms 28$^a$ which may be integrally formed and riveted or otherwise attached to the slide 24. The outer ends of the arms 28$^a$ are spaced apart and suitably shaped in accordance with the curvature of the neck of the lower bowl and are provided with outwardly flaring ends 28$^b$. Upon pressing the neck of a lower bowl horizontally against the ends 28$^b$ of the arms, they are cammed or sprung apart for receiving the neck within the curved portions 28$^c$ of the arms, as illustrated in Figs. 1 and 2. When a bowl is in such position of engagement, the intermediate portions of the arms diverge outwardly, as shown in Fig. 2, for the purpose hereinafter described.

A second pair of gripping members is also preferably provided for engaging the upper bowl 12, said gripping members being indicated generally by the numeral 29. The gripping member 29 comprises likewise a pair of arms 29$^a$ which may be integrally formed and may be riveted or otherwise secured to the slide member 24. The arms 29$^a$ are also resilient and are shaped to receive therebetween the upper bowl 12 and to grip the same resiliently for assisting in the stabilization of the coffee maker. The gripping members 28 and 29 being secured to the slide 24 move vertically with the latter.

In brewing coffee with the apparatus described, water is placed in the lower bowl and ground coffee in the upper bowl, and when the water has been forced into the upper bowl, it is necessary to terminate the application of heat to the lower bowl to enable the coffee brew to return to the latter. Generally with this type of coffee brewer the apparatus is removed from the burner, but in the present instance, it is only necessary to turn off the heat by operating the switch 17, and by grasping the handle of the lower bowl to lift upwardly on it for the purpose of elevating the lower bowl to the dotted line position shown in Fig. 1. When the coffee brewer has been elevated to such position, the flange or latch member 26 will be pressed to the right as viewed in Fig. 3 into the slot 27, that is, to the full line position shown in said figure. This arrangement automatically releasably latches the coffee brew equipment in the elevated position. In such elevated position, the lower bowl will cool rapidly due to its elevation above the burner and to the termination of the heating energy of the burner and hence the return of the coffee brew from the upper bowl 12 to the lower bowl 11 will be quickly effected. While in such elevated position, both bowls are gripped by the gripping members 28 and 29 which tend to prevent the bowls from being tilted from the vertical position or thrown from the standard by the rolling or pitching of a vehicle on which they are used.

Since the arms of the gripping members are flexible, it is desirable that the arms 28$^a$ which engage the neck of the lower bowl be positively locked against separation and release of the lower bowl while in the elevated position. For this purpose a U-shaped locking member 30 is provided which, in the form illustrated, is pivoted on the pintle 31 which extends through the arms of a U-shaped supporting bracket 32 which may be riveted or otherwise secured to the exterior of the standard 18, as shown in Figs. 1 and 3. The transverse portion 30$^a$ of the U-shaped locking member 30 is provided with a recess 30$^b$ which is open at the lower edge and of a width to receive the arms 28$^a$ of the gripping member 28 as the latter is moved to the elevated position above described.

The openings in the lock member 30 through which the pintle 31 passes are so located that the member 30 normally hangs in the full line position shown in Fig. 1. As the arms 28$^a$ move upwardly during the elevation of the coffee brewer apparatus to the dotted line position shown in Fig. 1, the arms pass into the slot or notch 30$^b$ of the member 30 and swing the member 30 counter-clockwise from the full line position of Fig. 1 to the dotted line position thereof. Such swinging movement of the lock causes the vertical walls of the notch 30$^b$ to engage the outer walls of the diverging arms 28$^a$ and press the same against the neck of the lower bowl and thereby positively retain the arms in gripping relation with the neck of the bowl for adequately supporting the same. The coffee maker, while in the elevated position, is thereby positively locked to the reciprocating mechanism against accidental release and cannot easily be withdrawn from the gripping members 28 and 29. For restoring the brewer to the lower or normal position upon the heating element after the brewing operation is completed, an operator, by grasping the handle of the lower bowl and tilting the said counter-clockwise in a vertical plane can move the upper end of the slide 24 inwardly to release the flange 26 from the slot 27 whereby the bowl gripping members and the bowls can be lowered to the normal position. Such movement of the bowls frees the arms 28$^a$ from the positive locking action of the member 30 as will be obvious. The upper bowl 12 may then be removed from the lower bowl and placed in a supporting bracket 33 which is mounted for convenience at the upper end of the rear face of the standard 18. A spring 34, secured beneath the bracket 33, preferably is provided for contacting the funnel of the bowl 12 for reducing vibration of the latter within the bracket. The switch 17 may then be operated, if desired, to turn on sufficient heat for keeping the coffee at a suitable temperature. When an operator wishes to remove the lower bowl, he merely grasps the handle thereof and pulls to the right, the arms 28$^a$ separating by reason of their flexibility to release the bowl. In replacing the bowl, he causes the neck thereof to engage the outwardly flared ends 28$^b$ of the gripping members 28$^a$ and presses the bowl inwardly.

By means of the present improvements, the bowls of the coffee brewer are retained in position against the likelihood of being tilted from the burner by reason of the movements of the vehicle on which the coffee maker is employed, and when the brewer is in the elevated position, the brewer is positively locked by the gripping member 28 to enable the same to support the weight of the brewer with safety. In beginning a coffee brewing operation the upper and lower bowls with the ground coffee and the water respectively therein may be assembled before placing the same upon the source of heat, if desired, since it is merely necessary to press the bowls against the respective gripping members to cause the same to move apart sufficiently to receive the bowls into gripping relation. Thus an operator may manipulate two coffee brewers at the same time, one in each hand, since only a horizontal movement of a coffee brewer is required in placing the same in its position upon a burner or in removing the same therefrom.

While I have shown and described a particular embodiment of my improvements for the purpose of illustration, it will be seen that various modifications of the structure described may be resorted to without departing from the spirit of my invention.

I claim:

1. In combination, a burner on which is adapted to be seated the lower bowl of a vacuum type coffee maker, a vertical standard adjacent said burner, a vertically operable slide on said standard provided with releasable engaging means for said lower bowl comprising a pair of flexible arms adapted to be sprung apart for receiving or releasing a neck of a lower bowl, means for supporting said slide in an elevated position for supporting said engaging means and a lower bowl engaged thereby in an elevated position with respect to said burner, and means carried by the standard for engaging said arms to prevent separation thereof for rendering said engaging means nonreleasable when in said elevated position.

2. Coffee brewing apparatus comprising a burner on which the lower bowl of a vacuum type coffee maker is adapted to be seated, a vertical standard adjacent said burner, a vertically reciprocable slide in said standard, a pair of oppositely movable gripper arms carried by said slide projecting over said burner for engaging therebetween a portion of said bowl whereby said slide and arms can be elevated by manual elevation of said engaged bowl, means for latching said slide in an elevated position for supporting the bowl at an elevation above the burner, and locking means carried by the standard at an elevation for engaging said arms for securing said arms against opposite movement while the latter are in said elevated position only.

3. Coffee brewing apparatus comprising a burner on which the lower bowl of a vacuum type coffee maker is adapted to be positioned, a vertical standard adjacent said burner, a vertically reciprocable slide on said standard provided with a pair of horizontally extending relatively movable arms adapted to be moved apart to engage releasably therebetween a neck portion of a lower bowl and to move said slide upwardly upon elevation from the burner of a lower bowl engaged by said arms, means on the standard for latching said slide in an elevated position, and means on said standard for engaging said arms in the corresponding elevated position thereof for locking the same against separating movement to prevent release therefrom of said elevated bowl.

4. Coffee brewing apparatus comprising a burner on which is adapted to be positioned the lower bowl of a vacuum type coffee maker, a vertical standard adjacent the burner provided with a vertically reciprocable slide, a pair of resilient arms on said slide extending over said burner and arranged to be sprung apart by the neck of a lower bowl to receive the same releasably therebetween to support the same against tilting movement relative to the burner while seated thereon, said arms and slide being movable vertically by manual elevation of the engaged bowl, means for latching said slide in an elevated position for supporting said bowl in a position above the burner, and means on said standard for locking said arms against outward spring movement while the bowl is in said elevated position for preventing release of the elevated bowl from said arms.

5. Coffee brewing apparatus comprising a burner upon which the lower bowl of a vacuum type coffee maker is adapted to be placed, a vertical standard adjacent the burner, a vertically reciprocable slide on the standard arranged for limited tilting movement relative thereto provided with horizontally disposed upper and lower pairs of arms arranged respectively for engaging releasably the upper and lower bowls of a coffee maker positioned on the burner whereby the slide can be elevated by manual elevation of the engaged coffee maker, coacting latching members carried by said standard and slide arranged for latching the slide releasably in an elevated position upon tilting movement of the slide relative to the standard when the slide is in said elevated position, and means for locking said lower pair of arms against release of said lower bowl when in said elevated position, said latching members being releasable by opposite tilting movement of said slide whereby the latter and said coffee maker can be lowered to move the lower bowl into heating position with respect to the burner and effect automatically the unlocking of said lower bowl engaging arms.

6. Apparatus of the class described comprising a vertical standard having a guiding passage therein, a vertically reciprocable slide member disposed within said passage, a spring for resiliently urging one end of said slide in a horizontal direction, a flange on said guide arranged to be moved by said spring into a slot in said standard when said guide has been raised to a given elevation whereby said slide is releasably latched in said elevated position, and a pair of vertically spaced bowl gripping members secured to said slide and movable therewith and arranged to engage the upper and lower bowls of an assembled coffee maker of the vacuum type for resisting tilting of the latter relative to the standard and for supporting the bowls in an elevated position when said slide is in the elevated position.

7. In combination, a vacuum type coffee maker comprising asembled upper and lower bowls, a heater for the lower bowl and on which the same is adapted to be mounted, a vertical standard adjacent said burner, a pair of cooperating resilient members arranged to be sprung apart for receiving a portion of the lower bowl therebetween for gripping said lower bowl and being slidably connected to said standard whereby the gripping means is movable vertically of the standard upon elevation of the lower bowl above said burner, means for latching said gripping means in a given elevated position, and means carried by said standard arranged to engage said gripping member to lock the same in gripping relation with said lower bowl for preventing release of the same while in said elevated position.

8. Coffee brewing apparatus comprising a burner over which the lower bowl of assembled lower and upper bowls of a vacuum type coffee maker is adapted to be positioned, mechanism adjacent the burner comprising a vertical standard provided with a pair of vertically slidable horizontally disposed resilient arms arranged to grip a portion of a lower bowl therebetween for preventing tilting of the coffee maker with respect to the burner, said arms being movable vertically of the standard by said lower bowl upon manual elevation of the latter a given distance above said burner, means for latching the arms in said elevated position, and means carried by the standard for engaging said arms at said elevation for locking the same against separation from bowl engaging relation.

9. Means for preventing the upper and lower bowls of a vacuum type coffee maker from tilting from a burner and to enable the same to be elevated above the burner comprising a vertical standard adjacent the burner, a slide member movable vertically on the standard, means for releasably latching the slide in elevated position, a bowl gripping member secured to the slide and comprising a pair of resilient arms projecting forwardly therefrom for gripping the lower bowl of the coffee maker, and a locking member secured to the standard and having a portion extending transversely of the arms and provided with a slot of a length to receive the arms and to clamp the arms against separating movement when said arms are in elevated bowl supporting position.

10. Coffee brewing apparatus comprising a burner, a vertical standard adjacent the burner, a reciprocal slide member movable along the standard, a pair of bowl stabilizing arms secured to the slide member and comprising portions extending divergently from said slide member and provided with cooperating end portions disposed over the burner for engaging the brewer bowl on the burner for preventing tilting of the brewer from the burner, said arms and slide member being guided vertically by said standard upon elevation of the brewer manually from the burner, means for releasably latching said slide, arms, and bowl in elevated position and a clamp member pivotally secured to said standard and arranged normally to hang in an inclined position above said arms and provided with a clamping portion for engaging the arms as the latter approach said elevated position for moving said clamping member pivotally to effect movement of said clamping portion outwardly along said divergent portions of the arms to clamp the outer ends thereof in supporting contact with said bowl.

NORMAND W. MORSE.